United States Patent Office 2,988,882
Patented June 20, 1961

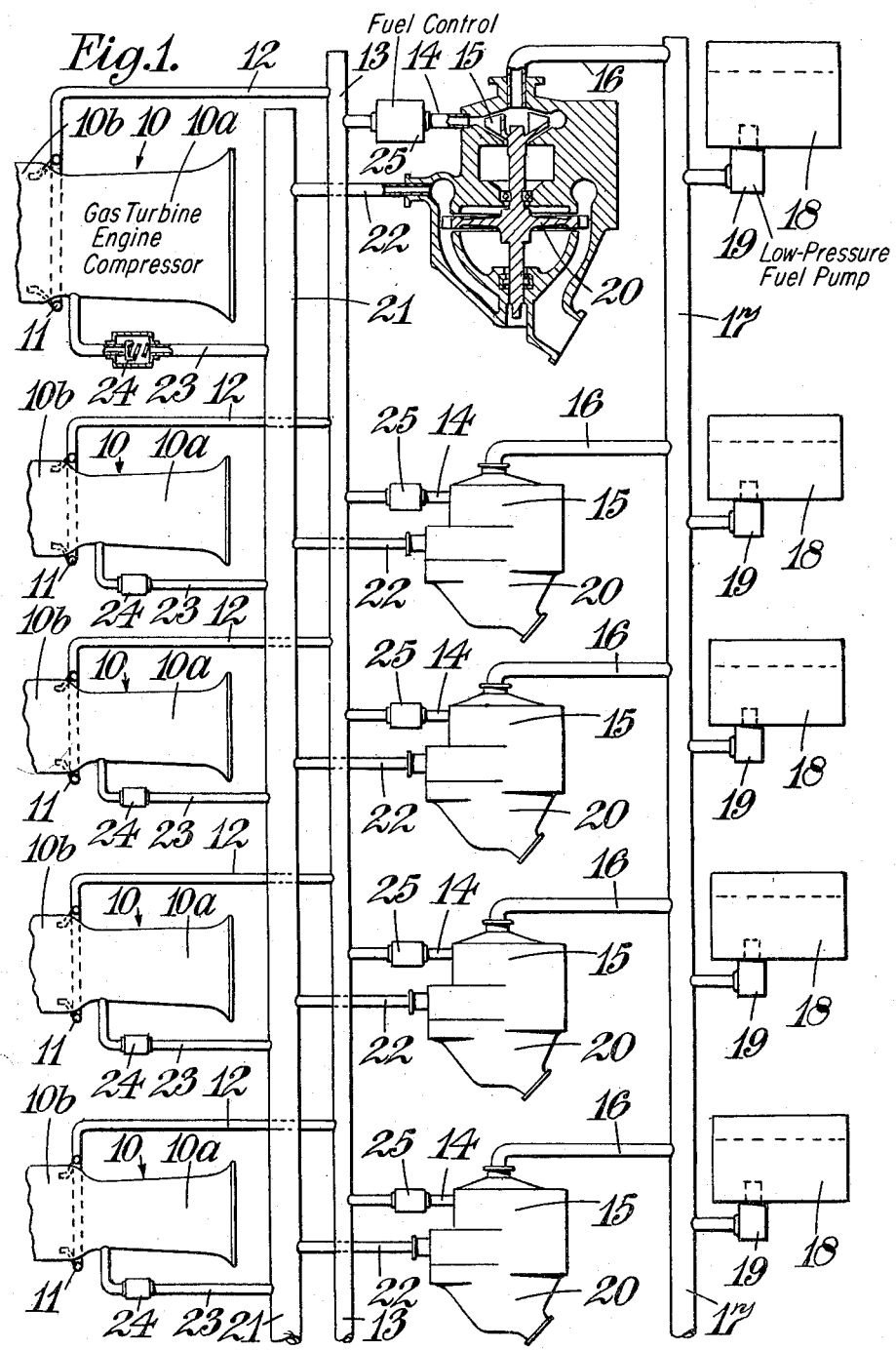

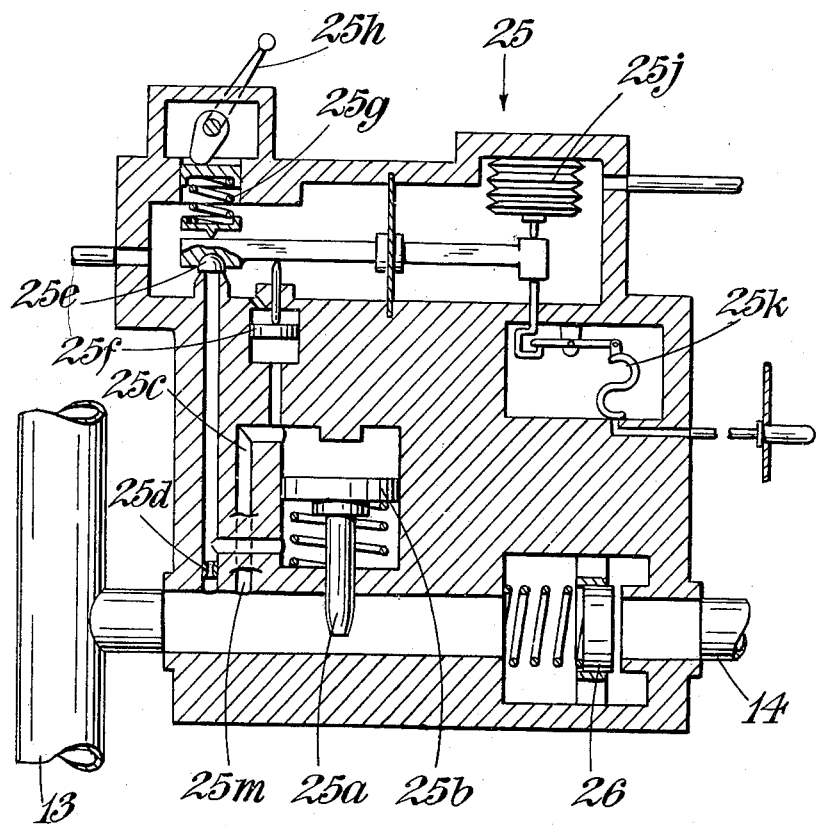

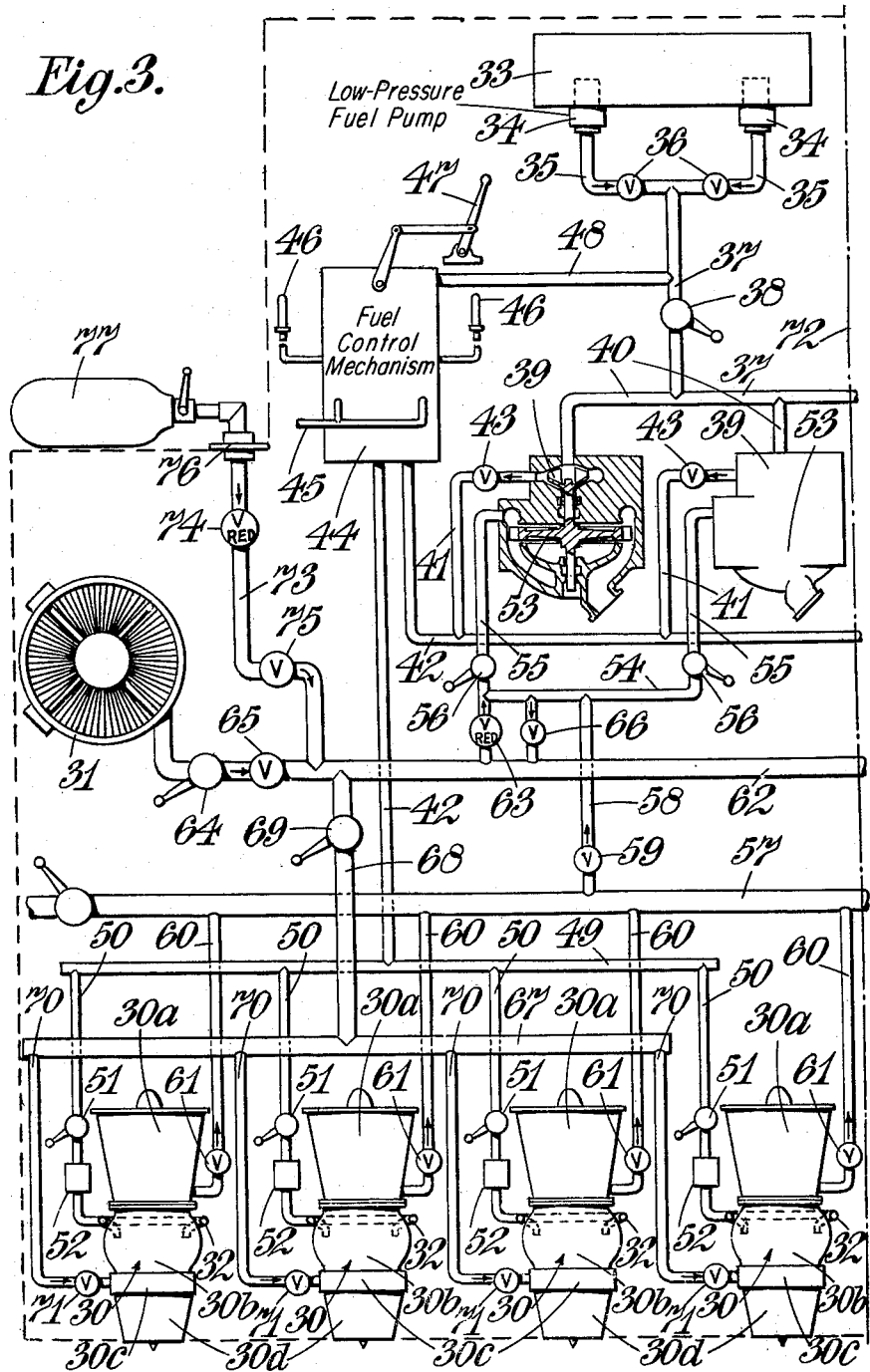

2,988,882
AIRCRAFT MULTI-ENGINE POWER PLANT AND FUEL SYSTEM THEREFOR
John Shaw Hollings, Chellaston, England, assignor to Rolls-Royce Limited, Derby, England, a British company
Filed Mar. 7, 1955, Ser. No. 492,401
Claims priority, application Great Britain Mar. 11, 1954
4 Claims. (Cl. 60—39.28)

This invention relates to aircraft power plants and relates, more specifically, to aircraft power plants comprising a plurality of engines.

The invention has an important application to aircraft having a power plant including a bank of lift engines of the jet propulsion kind, that is jet engines arranged with their jet nozzles directed downward so as to produce a lift force on the aircraft.

The present invention has for an object to provide an improved fuel supply arrangement for aircraft having a power plant including a plurality of engines.

According to the present invention, an aircraft power plant comprises a plurality of engines, a high-pressure fuel main, each of the engines being connected separately to the main to be fed with fuel therefrom, and a plurality of air-turbine-driven, high-pressure fuel pumps separately connected to deliver fuel under pressure to the fuel main, each of said fuel pumps having a designed maximum delivery capacity such that the pressure is maintained within the main on failure of a high-pressure fuel pump.

Preferably, the number of pumps equals or is an aliquot sub-multiple of the number of engines, and the pumps are driven by individual turbines fed with working fluid from a manifold which receives pressure gas through individual tappings from each engine.

Preferably also the turbine-driven fuel pumps are separately connected to a common low-pressure fuel main to draw fuel therefrom so that the pumps are connected in parallel between the high-pressure and low-pressure fuel mains, and the low-pressure fuel main is fed with fuel from a plurality of fuel tanks by associated fuel tank pumps.

The high-pressure fuel pumps are provided with individual controls and the controls may be connected between the pumps and the high-pressure main, or between the working fluid manifold and the turbines.

Two arrangements of this invention will now be described with reference to the accompanying diagrammatic drawings, in which:

FIGURE 1 shows one arrangement,
FIGURE 2 shows a detail, and
FIGURE 3 shows the second arrangement.

Referring to FIGURE 1, there are indicated a number of gas-turbine engines 10, which may be lift engines, of each of which only the compressor 10a and the upstream end of the combustion equipment 10b are shown.

Each engine has a fuel manifold 11 from which fuel is delivered into the combustion equipment 10b, and each manifold 11 is connected by an individual supply branch 12 to a high-pressure fuel main 13. The main 13 is fed with fuel under pressure by being connected through the separate delivery pipes 14 of a plurality of centrifugal fuel pumps 15 which draw in fuel through individual suction pipes 16 from a low-pressure fuel main 17. The main 17 is fed with fuel from a plurality of fuel tanks 18 by individual low-pressure pumps 19. The number of pumps 15 is equal to the number of engines 10.

It will be seen with this arrangement that the pumps 15 deliver in parallel from the low-pressure main 17 to the high-pressure main 13, and it is arranged by giving the pumps 15 a suitable maximum delivery that, if say one pump 15 fails, the remainder of the pumps 15 are capable of maintaining the desired pressure in the main 13 and supplying the engine fuel requirements.

Each pump 15 is driven by a respective air turbine 20, and the working fluid for operating the turbines 20 is obtained from a pressure air manifold 21 through individual conduits 22. The pressure air manifold 21 receives its pressure air from the engines 10 through individual tappings 23. For instance the tappings may be made from the delivery ends of the engine compressors 10a but if desired they may be made from any other convenient point in the engines, where the air has been compressed but is not at excessive temperature. Each of the tappings 23 has a non-return valve 24 connected in it.

Each of the fuel pumps 15 has a control associated with it and in the arrangement illustrated the control referenced 25, is shown (see FIGURE 2) to be connected in the corresponding delivery pipe 14 leading to the high-pressure fuel main 13; each delivery pipe 14 will also be provided with a non-return valve 26. However, if desired, the control of the pump delivery may be effected by controlling the speed of the air turbine 20 which drives the pump and in this case the control may be provided in the corresponding conduit 22 and may be in the form of an air throttle.

A throttle valve 25a of the control 25 in the fuel delivery pipe-line 14 (or in the air conduit 22 where the air supply to the turbine is controlled) may be connected to a servo-piston 25b, one side of which is connected directly through conduit 25c to a source of servo-fluid pressure, for example the fuel pressure in the main 13, and the other side of which is connected to the source through a restrictor 25d. The pressure on the second side is controlled by a vent valve 25e, and it may be arranged that closure of the vent valve causes an increase in the fuel supply to the high-pressure main 13. In this case the vent valve will be loaded in the sense of opening by the pressure in the main 13 through piston 25f, and will be loaded in the sense of closing by a spring 25g of which the datum may be selected manually by lever 25h. The half-ball vent valve 25e will also be loaded in the sense of closing on increase of ambient atmospheric pressure or engine intake pressure, for example by means of a capsule 25j subjected to the pressure, and may also be loaded in the sense of opening on increase in engine intake temperature, for example by means of a mercury bulb and Bourdon tube 25k.

It will be apparent that the rate of fuel delivery from the turbine-driven fuel pumps to the high-pressure main 13, for given ambient atmospheric conditions and a given setting of the manual control, will be dependent solely on the fuel pressure in the high-pressure main; it is proposed that no individual controls should be fitted to the engines.

Referring now to FIGURE 3, there is shown a second arrangement of aircraft power plant which comprises, on each side of the chain line 72, a bank of lift engines 30 supplied by the fuel system shown and the aircraft also has two propulsion engines 31.

Each lift engine 30 comprises a compressor 30a delivering air into combustion equipment 30b, and a turbine 30c which receives combustion products from the combustion equipment 30b and which exhausts to a downwardly-directed propulsion nozzle 30d. The combustion equipment 30b has associated with it a fuel manifold 32 from which fuel is delivered into the combustion space.

The lift engines 30 have a common fuel system which comprises a fuel tank 33 from which fuel is drawn by fuel tank low-pressure pumps 34 to be delivered through pipes 35 past non-return valves 36 into a low-pressure fuel main 37 containing a shut-off cock 38.

The fuel system also comprises a number of centrifugal fuel pumps 39 whereof the suction pipes 40 are connected to the low-pressure fuel main 37 and whereof the delivery pipes 41 lead separately to a high-pressure fuel main 42. In effect, therefore, the fuel pumps 39 are connected in parallel between the low-pressure main 37 and the high-pressure main 42. Non-return valves 43 are provided in the delivery pipes 41. The high-pressure fuel main 42 has connected in it a control mechanism 44 by which the flow of fuel in the main 42 is compensated for variations in the ambient atmospheric pressure (or altitude) and for variations in the ambient atmospheric temperature. The control 44 may be of any known or convenient kind and it is shown as having a connection 45 to atmosphere and temperature-sensitive elements 46 which are subjected to the ambient temperature. Also connected to the control is a throttle 47 by which a basic rate of flow is selected. A low-pressure drain pipe is shown at 48, such as is normally incorporated in known controls as just described for conveying servo fuel which has been used to produce controlling movements back to the suction side of the pumps 39. The control 44 may be similar to the control 25 of FIGURES 1 and 2.

The high-pressure fuel main 42 leads to a high-pressure fuel manifold 49 from which extend a series of branches 50 each leading to a corresponding one of the manifolds 32 associated with the lift engines 30. Each branch 50 contains a shut-off cock 51 and an acceleration control unit 52, which unit controls the fuel supply during acceleration of the corresponding engine 30 and which may be of any known or convenient construction.

It will be seen that with this fuel system each lift engine 30 can be brought into operation independently of the others. Also to cater for failure of a fuel pump 39, the fuel pumps are designed so that each has a maximum delivery capacity adequate to maintain the desired pressure in the main 42 on failure of one of the fuel pumps. Since the fuel pumps 39 are in parallel with one another, each can be cut out in operation without affecting the total delivery of fuel through the fuel system from the others.

In this arrangement the number of fuel pumps is an aliquot sub-multiple of the number of engines 30, there being one pump for each two lift engines 30.

The fuel pumps 39 are driven by individual air turbines 53 which are supplied with working fluid from a first manifold conduit 54 through branches 55 each of which contains a shut-off valve 56.

The first manifold conduit 54 may be fed with air under pressure in a number of ways. In the first supply arrangement, which is used in normal running of the lift engines 30, there is provided a second air supply manifold conduit 57 which is joined to the conduit 54 by a connecting conduit 58 containing a non-return valve 59, and the second manifold conduit 57 is itself supplied with air under pressure through a series of tapping conduits 60 each containing a non-return valve 61 and leading from the delivery of the compressor 30a of a corresponding one of the lift engines 30.

A second way in which the first manifold conduit 54 may be supplied with pressure air is by tapping pressure air from the delivery of the compressor of the propulsion gas-turbine engine 31 by means of a third manifold conduit 62 and connecting the third manifold conduit 62 to the first manifold conduit 54 by means of a reducing valve 63. This way may be used in starting the lift engines. The third manifold conduit 62 has at its inlet end a shut-off valve 64 and a non-return valve 65. Under certain circumstances of operation, it may be desirable to supply pressure air from the lift engines 30 through tapping conduits 60, the second manifold conduit 57 and the first manifold conduit 54 to the third manifold conduit 62, and since usually a reducing valve such as 63 only permits an air flow in the one direction, there is provided in parallel with the reducing valve 63 a non-return valve 66 which permits an air flow in the opposite direction to the reducing valve 63 when the pressure in the manifold conduit 62 is at a value below that in the manifold conduit 54.

In operation of the aircraft, the pressure air supply from the third manifold conduit 62 is employed for starting the lift engines and the manifold conduit 62 is connected to the lift engines in the following way. There is provided a fourth manifold conduit 67 which is joined to the third manifold conduit 62 by a connecting pipe 68 containing a shut-off valve 69, and the fourth manifold conduit 67 has a number of branch pipes 70, each of which contains a non-return valve 71 and leads to the turbine 30c of a corresponding one of the lift engines 30.

Since the power plant is symmetrical about the chain line 72, it is possible after starting the lift engines 30 in one bank to employ air tapped off from them to start lift engines in a second bank, the supply of pressure air to the third manifold conduit 62 flowing from the lift engines 30 through the tapping conduit 60 to the second manifold conduit 57 and thence through connecting conduit 58 into the first manifold conduit 54 and thence through the non-return valve 66 into the third manifold conduit 62 from whence it is conveyed to the fourth manifold conduit of the second bank of lift engines.

For starting purposes also the apparatus may be supplied with air under pressure from externally of the aircraft and for this purpose there is provided a supply conduit 73 containing a reducing valve 74 and non-return valve 75, which conduit 73 has at its upstream end a connector 76 by which it may be connected to the external source of pressure air (indicated for convenience as an air bottle 77) and the opposite end of which is connected to the third manifold conduit 62 downstream of the non-return valve 65.

The second manifold conduit 57 may, if desired, be used for supplying pressure air to other parts of the aircraft, for instance to air jets at the wing tips for control purposes.

I claim:

1. An aircraft power plant, comprising a bank of lift gas-turbine engines, each having a compressor and a downwardly-directed outlet nozzle; a high-pressure fuel main, each of the engines being connected separately to the main to be fed with fuel therefrom; a plurality of high-pressure fuel pumps separately connected to the fuel main to deliver fuel under pressure thereto said fuel pumps having a designed maximum delivery capacity which is greater than the maximum demand of the engines in the ratio $N/N-1$, where N is the total number of said air-turbine-driven high-pressure fuel pumps, whereby the pressure is maintained within the main on failure of a high-pressure fuel pump enabling the maximum demand of the engine to be met; a number of air turbines equal to the number of said high-pressure fuel pumps, each air turbine driving an associated one of said fuel pumps; air supply manifold means connected to receive pressure air from each of said engines through individual tappings and connected to deliver pressure air separately to said air turbines; and a propulsion gas-turbine engine having an air compressor and a rearwardly-facing propulsion nozzle; said air supply manifold means comprising a first manifold conduit, branch conduits from said first manifold conduit to said air turbines, control cocks in said branch conduits, a second manifold conduit, a connecting conduit leading from said second manifold conduit to said first manifold conduit, a non-return valve in said connecting conduit adapted to permit air flow from said second manifold conduit to said first manifold conduit, tapping conduits leading from each lift engine to the second manifold conduit, non-return valves in said tapping conduits to permit air flow from the engine, a third manifold conduit connected to the air compressor of said propulsion engine to receive pressure air therefrom, a non-return valve at the inlet to said third manifold conduit, a pressure-reducing valve connected to convey pressure air from the third manifold conduit to the first manifold conduit, a non-return valve in parallel with said pressure-reducing valve and adapted to permit a flow of air from said first manifold conduit to said third manifold conduit when the pressure therein is at a value lower than that in the first manifold conduit, a fourth manifold conduit, a valve-controlled connection between said fourth and third manifold conduits, branch conduits leading from said fourth manifold conduit to convey air separately to the turbines of each of the lift engines for starting purposes, and non-return valves in said branch conduits.

2. An aircraft power plant as claimed in claim 1, comprising also a supply connection connected to said third manifold conduit and adapted to be supplied with pressure air from a pressure air supply externally of the aircraft.

3. An aircraft power plant as claimed in claim 1, comprising also individual control means for each of said high-pressure fuel pumps.

4. An aircraft power plant, comprising a bank of lift gas-turbine engines, each having a compressor and a downwardly-directed outlet nozzle; a high-pressure fuel main, each of the engines being connected separately to the main to be fed with fuel therefrom; a plurality of high-pressure fuel pumps separately connected to the fuel main to deliver fuel under pressure thereto, said fuel pumps having a designed maximum delivery capacity which is greater than the maximum demand of the engines in the ratio $N/N-1$, where $N$ is the total number of said air-turbine-driven high-pressure fuel pumps whereby the pressure is maintained within the main on failure of a high-pressure fuel pump enabling the maximum demand of the engines to be met; a number of air turbines equal to the number of said high-pressure fuel pumps, each air turbine driving an associated one of said fuel pumps; and air supply manifold means connected to receive pressure air from each of said engines through individual tappings and connected to deliver pressure air separately to said air turbines.

References Cited in the file of this patent

UNITED STATES PATENTS

| | | |
|---|---|---|
| 1,824,010 | Cartasso | Sept. 22, 1931 |
| 2,517,313 | Hooker et al. | Aug. 1, 1950 |
| 2,612,020 | Griffith | Sept. 30, 1952 |
| 2,617,361 | Neal | Nov. 11, 1952 |
| 2,669,837 | Harris | Feb. 23, 1954 |
| 2,706,888 | Ballantyne et al. | Apr. 26, 1955 |
| 2,768,504 | Wente et al. | Oct. 30, 1956 |